United States Patent
Estrada

(10) Patent No.: US 10,093,362 B2
(45) Date of Patent: Oct. 9, 2018

(54) VEHICLE TAILGATE LATCH AND TAILGATE SYSTEM

(71) Applicant: Eduardo Estrada, Chihuahua (MX)

(72) Inventor: Eduardo Estrada, Chihuahua (MX)

(73) Assignee: INTEVA PRODUCTS, LLC, Troy, MI (US)

( * ) Notice: Subject to any disclaimer, the term of this patent is extended or adjusted under 35 U.S.C. 154(b) by 135 days.

(21) Appl. No.: 14/970,509

(22) Filed: Dec. 15, 2015

(65) Prior Publication Data

US 2017/0166265 A1     Jun. 15, 2017

(51) Int. Cl.

| | |
|---|---|
| *E05C 3/06* | (2006.01) |
| *E05C 3/04* | (2006.01) |
| *E05C 3/16* | (2006.01) |
| *E05C 19/18* | (2006.01) |
| *E05C 19/00* | (2006.01) |
| *B62D 33/037* | (2006.01) |
| *E05C 3/12* | (2006.01) |
| *E05C 3/14* | (2006.01) |
| *E05B 85/10* | (2014.01) |
| *E05B 83/22* | (2014.01) |
| *E05B 81/20* | (2014.01) |
| *E05B 83/18* | (2014.01) |

(52) U.S. Cl.
CPC ............ *B62D 33/037* (2013.01); *E05B 85/10* (2013.01); *E05C 3/12* (2013.01); *E05C 3/14* (2013.01); *E05B 81/20* (2013.01); *E05B 83/18* (2013.01); *E05B 83/22* (2013.01)

(58) Field of Classification Search
CPC ........ B60J 5/102; B62D 33/03; B62D 33/037; E05B 85/10; E05B 83/22; E05B 81/20; E05B 53/18; E05C 3/12; E05C 3/14

USPC ........ 292/196, 210, 293, 280, DIG. 42, 216, 292/199; 296/57.1

See application file for complete search history.

(56) References Cited

U.S. PATENT DOCUMENTS

| | | | | |
|---|---|---|---|---|
| 3,145,988 | A * | 8/1964 | Colautti | B60J 1/1861 267/74 |
| 3,180,673 | A * | 4/1965 | Wanlass | E05B 81/20 292/DIG. 29 |
| 3,387,406 | A * | 6/1968 | Coker | B60J 5/103 16/231 |
| 3,400,961 | A * | 9/1968 | Koch | E05B 85/24 292/216 |
| 3,454,299 | A * | 7/1969 | Hewitt | B62D 33/0273 296/50 |
| 3,592,504 | A * | 7/1971 | Sandor | B60J 5/103 16/231 |
| 3,623,764 | A * | 11/1971 | Jacobus | B60J 5/103 16/232 |
| 3,645,043 | A * | 2/1972 | Velavicius | B60J 5/12 296/106 |
| 3,977,718 | A * | 8/1976 | Nordberg | B62D 33/037 292/DIG. 29 |

(Continued)

*Primary Examiner* — Kristina R Fulton
*Assistant Examiner* — Faria F Ahmad
(74) *Attorney, Agent, or Firm* — Cantor Colburn LLP

(57) ABSTRACT

A vehicle tailgate latch is provided. The latch having: a first portion; a second portion; a linkage for rotatably securing the first portion to the second portion, wherein the second portion is rotatably secured to the first portion for movement about a vertical axis with respect to the first portion; and a latching mechanism for releasing the second portion from the first portion.

15 Claims, 8 Drawing Sheets

(56) References Cited

U.S. PATENT DOCUMENTS

| | | | | |
|---|---|---|---|---|
| 4,076,301 A * | 2/1978 | Gergoe | B60J 5/103 | 16/232 |
| 4,531,773 A * | 7/1985 | Smith | B62D 33/0273 | 224/403 |
| 4,580,828 A * | 4/1986 | Jones | B60J 5/108 | 296/57.1 |
| 5,232,253 A * | 8/1993 | Tamiya | E05B 81/20 | 292/201 |
| 5,557,829 A * | 9/1996 | Schoen | E05D 3/145 | 16/371 |
| 5,685,594 A * | 11/1997 | Harper | B62D 33/0273 | 292/175 |
| 5,868,444 A * | 2/1999 | Brackmann | E05B 81/20 | 292/196 |
| 5,947,536 A * | 9/1999 | Mizuki | E05B 63/143 | 292/201 |
| 6,017,067 A * | 1/2000 | Yoneyama | E05B 83/16 | 292/216 |
| 6,604,797 B2 * | 8/2003 | Lehmann | E05B 65/0071 | 292/196 |
| 6,779,820 B2 * | 8/2004 | Ogino | E05B 83/16 | 292/216 |
| 6,938,941 B2 * | 9/2005 | Thiele | B60P 1/26 | 16/334 |
| 7,165,800 B2 * | 1/2007 | Thiele | B60P 1/26 | 16/366 |
| 7,232,173 B2 * | 6/2007 | Katterloher | B62D 33/03 | 296/50 |
| 7,243,973 B2 * | 7/2007 | Plett | B62D 33/0273 | 296/57.1 |
| 7,258,373 B2 * | 8/2007 | Plett | B60P 1/26 | 292/210 |
| 7,281,748 B2 * | 10/2007 | Ruhlander | B62D 33/0273 | 292/144 |
| 7,338,107 B1 * | 3/2008 | Wilcox | E05D 3/022 | 296/57.1 |
| 7,556,303 B2 * | 7/2009 | Waldner | B62D 33/037 | 292/194 |
| 7,690,710 B2 * | 4/2010 | Townson | E05D 3/10 | 296/50 |
| 7,699,378 B2 * | 4/2010 | Smith | B62D 33/03 | 16/303 |
| 7,971,460 B2 * | 7/2011 | Zagoroff | B62D 33/037 | 292/336.3 |
| 8,056,944 B2 * | 11/2011 | Jankowski | E05B 77/06 | 292/201 |
| 8,061,753 B2 * | 11/2011 | Papanikolaou | B62D 33/0273 | 16/224 |
| 8,136,862 B2 * | 3/2012 | Bator | B62D 33/0273 | 296/57.1 |
| 8,151,417 B1 * | 4/2012 | Ham | E05D 3/10 | 16/239 |
| 8,246,098 B2 * | 8/2012 | Cheung | B62D 33/0273 | 16/366 |
| 8,336,928 B2 * | 12/2012 | Okunaka | B62D 33/071 | 180/89.14 |
| 8,469,409 B2 * | 6/2013 | Plett | B62D 33/0273 | 292/201 |
| 8,720,956 B2 * | 5/2014 | Murray | B62D 33/0273 | 292/216 |
| 8,740,279 B1 * | 6/2014 | McGoff | E05B 83/20 | 296/51 |
| 8,936,330 B2 * | 1/2015 | Kim | E05D 3/10 | 126/190 |
| 9,221,499 B1 * | 12/2015 | Marchlewski | E05B 79/02 | |
| 2002/0109369 A1 * | 8/2002 | Boomhower | B60N 2/3047 | 296/63 |
| 2006/0001288 A1 * | 1/2006 | Thiele | B60P 1/26 | 296/50 |
| 2006/0125270 A1 * | 6/2006 | Madlinger | B62D 33/03 | 296/57.1 |
| 2007/0062748 A1 * | 3/2007 | Erwin | B60R 21/38 | 180/69.21 |
| 2008/0127690 A1 * | 6/2008 | Zagoroff | B62D 33/037 | 70/208 |
| 2008/0197651 A1 * | 8/2008 | Stratten | B62D 33/0273 | 296/50 |
| 2008/0277960 A1 * | 11/2008 | Zagoroff | B62D 33/03 | 296/57.1 |
| 2009/0243308 A1 * | 10/2009 | Ishiguro | E05B 17/041 | 292/196 |
| 2009/0250961 A1 * | 10/2009 | Townson | B62D 33/0273 | 296/57.1 |
| 2012/0060323 A1 * | 3/2012 | Lee | E05D 15/582 | 16/275 |
| 2012/0227217 A1 * | 9/2012 | Chen | G06F 1/1681 | 16/366 |
| 2014/0159386 A1 * | 6/2014 | Faruque | E05B 77/08 | 292/196 |

* cited by examiner

VEHICLE TAILGATE LATCH AND TAILGATE SYSTEM

BACKGROUND

Various embodiments of the present invention relate to a vehicle tailgate and more particularly, a latch for use with a dual function tailgate.

Some vehicles in particular pickup trucks are provided with a bed having an associated tailgate that can transition from an open position to a closed position. In order to retain the tailgate in the closed position a latch or latching device is required. In some applications it is desirable to have the tailgate pivot about one or more axes however, tailgate latches are configured for tailgates that only pivot about a single axis.

Accordingly, it is desirable to provide a tailgate latch or latch system that can function as both a hinge and/or a latch depending upon the axis of rotation of the tailgate.

SUMMARY OF THE INVENTION

A vehicle tailgate latch is provided. The latch having: a first portion; a second portion; a linkage for rotatably securing the first portion to the second portion, wherein the second portion is rotatably secured to the first portion for movement about a vertical axis with respect to the first portion; and a latching mechanism for releasing the second portion from the first portion.

In addition to one or more the features described above, or as an alternative to any of the foregoing embodiments, the linkage may further include a pair of arms.

In addition to one or more the features described above, or as an alternative to any of the foregoing embodiments, one end of one of the pair of arms may be slidably and rotatably received in an elongated opening of the first portion and an opposite end of the one of the pair of arms is rotatably received in the second portion and wherein one end of the other one of the pair of arms may be slidably and rotatably received in an elongated opening of the second portion and an opposite end of the other one of the pair of arms is rotatably received in the first portion.

In addition to one or more the features described above, or as an alternative to any of the foregoing embodiments, latching mechanism may have a first claw pivotally mounted to the second portion for rotation about an axis and a second claw pivotally mounted to the second portion for rotation about an axis, wherein the first claw is operatively linked to the second claw via an intermediary member rotatably mounted to the second portion for rotation about an axis.

In addition to one or more the features described above, or as an alternative to any of the foregoing embodiments, the first claw and the intermediary member each have gear teeth for meshingly engaging each other such that rotation of member about axis causes rotation of first claw and second claim.

In addition to one or more the features described above, or as an alternative to any of the foregoing embodiments, the latching mechanism may further include a release mechanism having a lever pivotally mounted to the second portion for rotation about an axis, wherein the lever is operably coupled to a release handle via a linkage such that actuation of the handle causes rotational movement of the lever.

In addition to one or more the features described above, or as an alternative to any of the foregoing embodiments, the release handle may be located on a surface of the tailgate.

In addition to one or more the features described above, or as an alternative to any of the foregoing embodiments, the latching mechanism may have a first claw pivotally mounted to the second portion for rotation about an axis and a second claw pivotally mounted to the second portion for rotation about an axis, wherein the first claw is operatively linked to the second claw via an intermediary member rotatably mounted to the second portion for rotation about an axis.

In addition to one or more the features described above, or as an alternative to any of the foregoing embodiments, the first claw and the intermediary member each have gear teeth for meshingly engaging each other such that rotation of member about axis causes rotation of first claw and second claim.

In addition to one or more the features described above, or as an alternative to any of the foregoing embodiments, the latching mechanism may further include a release mechanism having a lever pivotally mounted to the second portion for rotation about an axis, wherein the lever is operably coupled to a release handle via a linkage such that actuation of the handle causes rotational movement of the lever.

In addition to one or more the features described above, or as an alternative to any of the foregoing embodiments, the release handle may be located on a surface of the tailgate.

In yet another embodiment, a tailgate latch system is provided. The tailgate latch system including: an upper latch, comprising: a first portion; a second portion; a linkage for rotatably securing the first portion to the second portion, wherein the second portion is rotatably secured to the first portion for movement about a vertical axis with respect to the first portion; and a latching mechanism for releasing the second portion from the first portion, wherein the first portion is secured to a vehicle frame and wherein the second portion is secured to a tailgate; and a lower hinge comprising: a first portion operatively coupled to a second portion, wherein the second portion has a frame member secured to the tailgate while the first portion is secured to the frame member and wherein the lower hinge is configured to allow the tailgate to rotate about a horizontal axis when the second portion is released from the first portion.

In addition to one or more the features described above, or as an alternative to any of the foregoing embodiments, the first portion may have a shaft member rotatably received within a housing of the first portion, wherein shaft member is configured to rotate about horizontal axis.

In addition to one or more the features described above, or as an alternative to any of the foregoing embodiments, the frame member may be movably secured to the first portion via a linkage, wherein the linkage has a first arm member and a second arm member and wherein the first arm member has a first end rotatably and slidably received within an opening of the first portion and a second end of first arm member is also rotatably secured to the frame member for rotation about an axis and wherein the second arm member is rotatably secured to the first portion at a first end for rotation about axis and a second end of the second arm member is rotatably and slidably received within an elongated opening.

In addition to one or more the features described above, or as an alternative to any of the foregoing embodiments, the latching mechanism may have a first claw pivotally mounted to the second portion for rotation about an axis and a second claw pivotally mounted to the second portion for rotation about an axis, wherein the first claw is operatively linked to the second claw via an intermediary member rotatably mounted to the second portion for rotation about an axis.

In addition to one or more the features described above, or as an alternative to any of the foregoing embodiments, the first claw and the intermediary member each have gear teeth for meshingly engaging each other such that rotation of member about axis causes rotation of first claw and second claim and wherein the latching mechanism further comprises a release mechanism having a lever pivotally mounted to the second portion for rotation about an axis, wherein the lever is operably coupled to a release handle via a linkage such that actuation of the handle causes rotational movement of the lever.

In addition to one or more the features described above, or as an alternative to any of the foregoing embodiments, the system may further include a pair of upper latches and a pair of lower hinges and wherein the tailgate further comprises a left tailgate and a right tailgate each being secured to the vehicle frame by one of the pair of upper latches and one of the pair of lower hinges.

In addition to one or more the features described above, or as an alternative to any of the foregoing embodiments, the system may further include a pair of upper latches and a pair of lower hinges and wherein the tailgate further comprises a left tailgate and a right tailgate each being secured to the vehicle frame by one of the pair of upper latches and one of the pair of lower hinges.

In addition to one or more the features described above, or as an alternative to any of the foregoing embodiments, the linkage may further include a pair of arms and wherein one end of one of the pair of arms is slidably and rotatably received in an elongated opening of the first portion and an opposite end of the one of the pair of arms is rotatably received in the second portion and wherein one end of the other one of the pair of arms is slidably and rotatably received in an elongated opening of the second portion and an opposite end of the other one of the pair of arms is rotatably received in the first portion; and wherein the latch system further comprises a retention member pivotally mounted to the latch for rotation about an axis, wherein the retention member is spring biased towards end via a spring such that a cam surface retains end in one of two positions within opening.

In yet another embodiment, a method of pivotally and rotationally securing a tailgate to a vehicle frame is provided. The method including the steps of: pivotally securing the tailgate to the frame via an upper latch for rotation about a vertical axis; releasably securing the tailgate to the frame via the upper latch; pivotally securing the tailgate to the frame for rotational movement about the vertical axis via a lower hinge; and rotationally securing the tailgate to the frame for rotational movement about the horizontal axis via a lower hinge.

BRIEF DESCRIPTION OF THE DRAWINGS

These and/or other features, aspects, and advantages of the present invention will become better understood when the following detailed description is read with reference to the accompanying drawings in which like characters represent like parts throughout the drawings, wherein.

Although the drawings represent varied embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION

Figure 1:
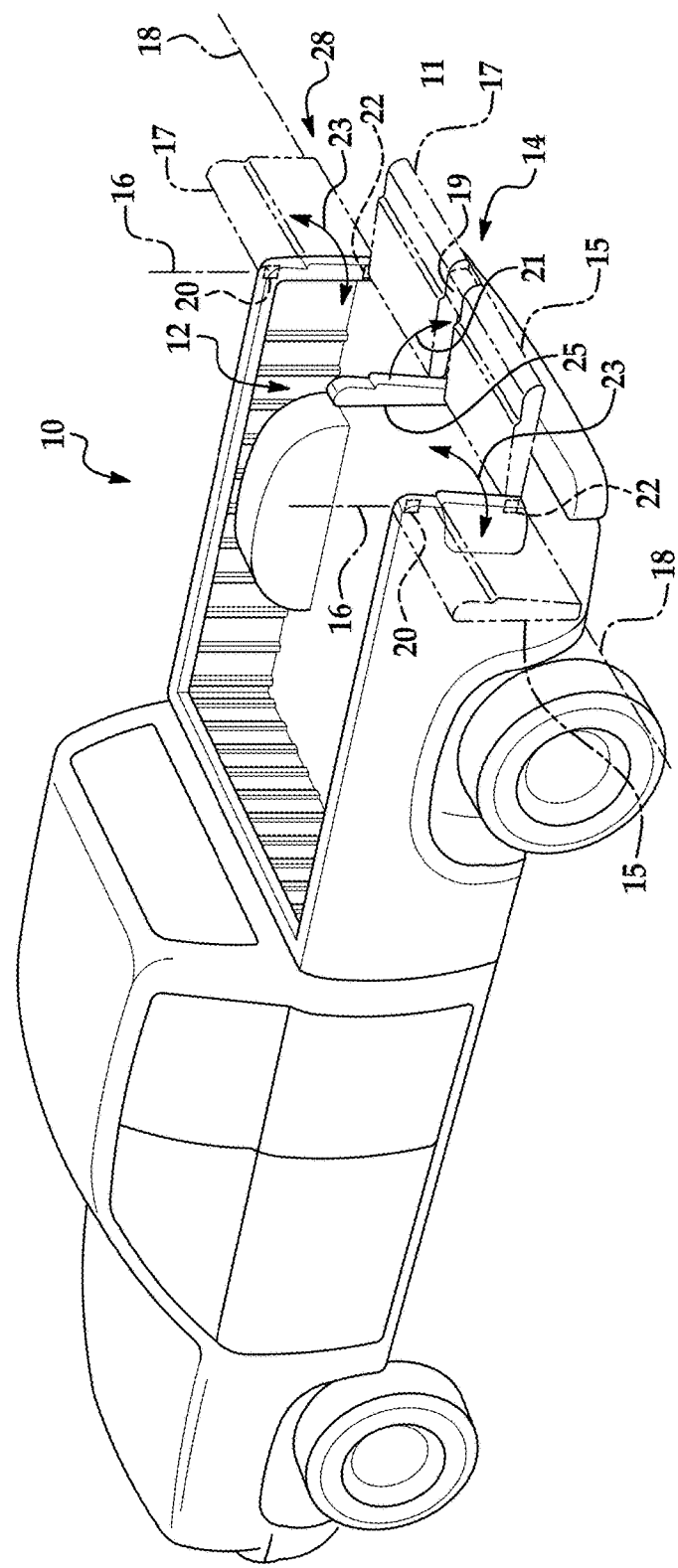
FIG. 1 is a view of a vehicle with the tailgate latches and/or tailgate latch system in accordance with an embodiment of the disclosure.

Referring now to the FIGS., portions of a vehicle 10 according to embodiments of the present disclosure are illustrated. In FIG. 1, the vehicle 10 is pickup truck having a bed 12 with a tailgate 14. In accordance with an embodiment of the disclosure, the tailgate 14 is openable by pivoting about at least two different axes illustrated as vertical axis 16 and horizontal axis 18. In order to allow for this function in accordance with an embodiment of the disclosure at least one of the latches functions as hinge as well as a latch.

In one embodiment, the tailgate 14 may comprise a first or left tailgate door 15 and a second or right tailgate door 17. In one embodiment, the first or left tailgate door 15 and the second or right tailgate door 17 are each secured to each other by a latch 19, which may comprise a striker located on either the first or left tailgate door 15 or the second or right tailgate door 17 and a latch configured to be releasably secured to the striker such that first or left tailgate door 15 or second or right tailgate door 17 can pivot about axis 18 as a single tailgate 14. In this embodiment, the tailgate 14 can pivot about axis 18 in the direction of arrows 21.

In order to allow for the first or left tailgate door 15 and the second or right tailgate door 17 to pivot about vertical axes 16, the latch 19 is released and the first or left tailgate door 15 and the second or right tailgate door 17 can pivot in the directions of arrows 23.

In an alternative embodiment, the vehicle 10 may have a central vertical frame portion 25 located between the first or left tailgate door 15 and the second or right tailgate door 17 and each of the first or left tailgate door 15 and the second or right tailgate door 17 have a latch 19. As mentioned above, latch 19, which may comprise a striker located on either the first or left tailgate door 15 or the second or right tailgate door 17 and a latch configured to be releasably secured to the striker such that first or left tailgate door 15 or second or right tailgate door 17 can pivot about axes 16 when they are released from central vertical frame portion 25.

In other words, the first or left tailgate door 15 and the second or right tailgate door 17 can either pivot independently about horizontal axis 18 (e.g., embodiment with central vertical frame portion 25 located between first or left tailgate door 15 and the second or right tailgate door 17) or the first or left tailgate door 15 and the second or right tailgate door 17 can pivot together about axis 18 (e.g., embodiment without central vertical frame portion 25 and the first or left tailgate door 15 and the second or right tailgate door 17 are releasably secured to each other by latch 19).

As illustrated in FIG. 1, the vertical axis 16 is located either side of the vehicle 10 such that the first or left tailgate door 15 and the second or right tailgate door 17 of tailgate 14 can pivot about the left side and the right side of the vehicle 10 respectively and independently. For the left tailgate door 15 to pivot about the left side of the vehicle 10, the vehicle 10 will have an upper latch 20 and a lower hinge 22 on the left side and latch 19 to cooperate with right side tailgate door 17 or central frame member 25. To allow for left side pivot, the latch 19 needs to only operate as a catch and release latch in order to allow for pivot about the vertical axis 16 on the left side of the vehicle.

For the right tailgate door 17 to pivot about the right side of the vehicle 10, the vehicle 10 will have an upper latch 20 and a lower hinge 22 on the right side and latch 19 to cooperate with the left side tailgate door 15 or central frame member 25. To allow for right side pivot of tailgate door 17, the latch 19 needs to only operate as a catch and release latch in order to allow for pivot about the vertical axis 16 on the right side of the vehicle.

The tailgate 14 and its associated latches and hinges of various embodiments of the present invention may collectively be referred to as a tailgate latch system 28.

Figure 2:
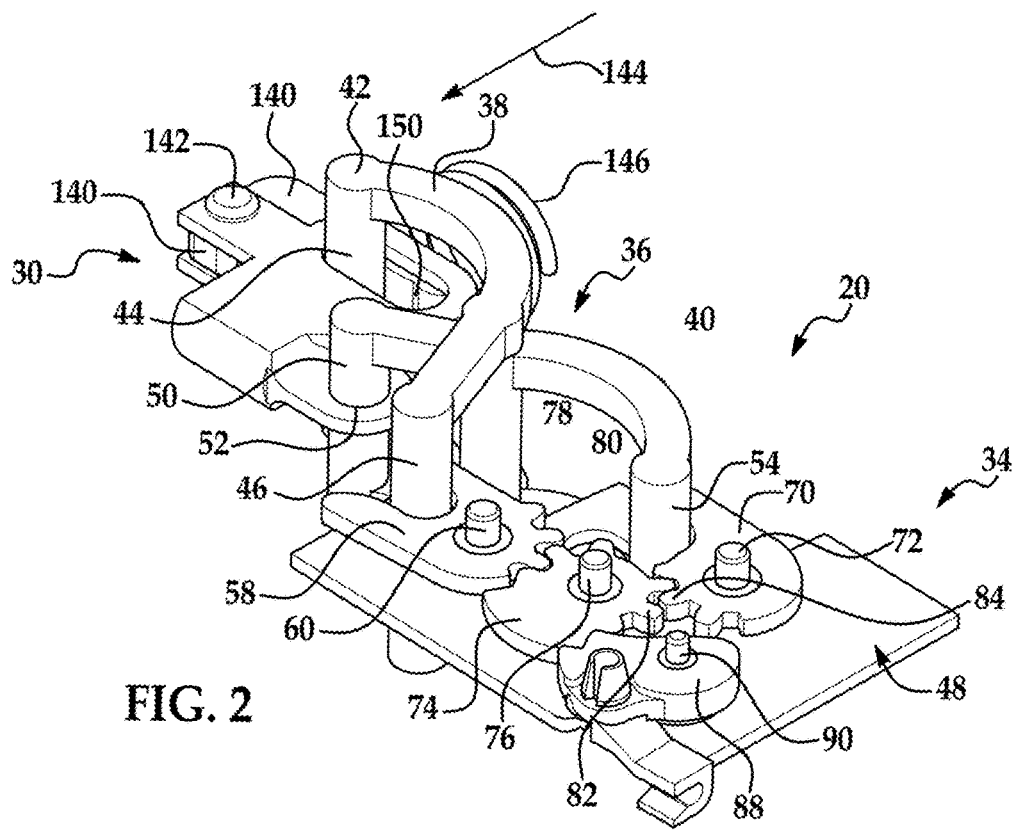
FIG. 2 is a perspective view of an upper latch of the tailgate latch system in accordance with an embodiment of the disclosure.
Figure 3:
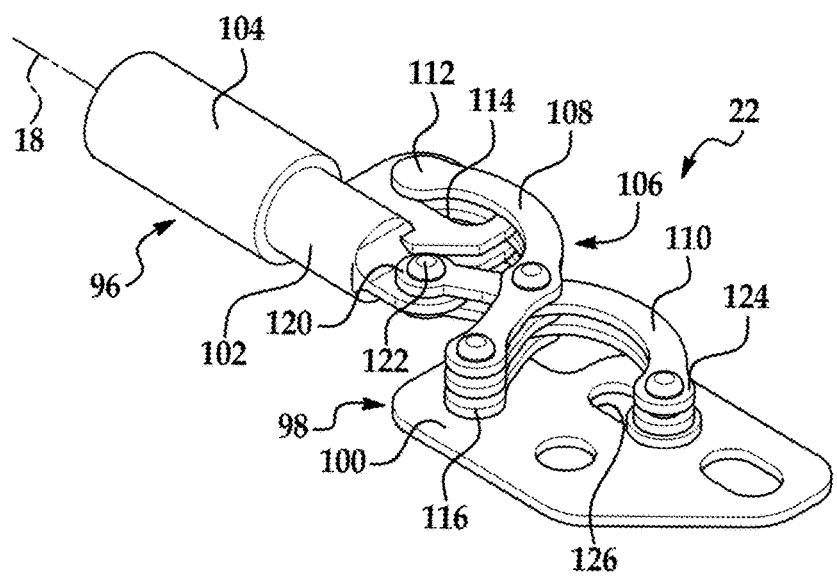
FIG. 3 is a perspective view of a lower hinge of the tailgate latch system in accordance with an embodiment of the disclosure.

FIG. 2 is a perspective view of the upper latch 20 of the tailgate latch system 28 in accordance with an embodiment of the disclosure while FIG. 3 is a perspective view of the lower hinge 22 of the tailgate latch system 28 in accordance with an embodiment of the disclosure. The upper latch 20 has a first portion 30 that is mounted to a frame 32 of the vehicle 10 and a second portion 34 that is mounted to a portion of the tailgate 14. In accordance with an embodiment of the disclosure, second portion 34 is releasably secured to first portion 30 such that tailgate 14 (e.g., door 15 and door 17 secured together) or left tailgate door 15 or right tailgate door 17 can pivot about horizontal axis 18 and second portion 34 is pivotally secured to first portion 30 such that tailgate 14 (e.g., door 15 and door 17 secured together) or left tailgate door 15 or right tailgate door 17 can pivot about vertical axis 16.

The first portion 30 and the second portion 34 of upper latch 20 are operably coupled to each other via a linkage 36 that comprises a pair of arms 38 and 40 each being secured to each other. Arm 38 has a first end 42 pivotally and slidably received in an opening 44 of first portion 30 and a second end 46 that is releasably secured to second portion 34 via a latching mechanism 48 of second portion 34. Arm 40 has a first end 50 pivotally received in an opening 52 of first portion 30 and a second end 54 that is releasably secured to second portion 34 via latching mechanism 48 of second portion 34. In addition, the second end 54 of arm 40 is also slidably received within an elongated opening 56 of second portion 34.

The latching mechanism 48 has a first claw, fork bolt or member 58 pivotally mounted to the second portion 34 for rotation about an axis 60 and a second claw, fork bolt or member 70 pivotally mounted to the second portion 34 for rotation about an axis 72. The first claw, fork bolt or member 58 is operatively linked to the second claw, fork bolt or member 58 via an intermediary member 74 rotatably mounted to the second portion 34 for rotation about an axis 76. In one embodiment, the first claw, fork bolt or member 58, the second claw, fork bolt or member 70 and the intermediary member 74 each have gear teeth illustrated as 78, 80, 82, 84 for meshingly engaging each other such that rotation of member 74 about axis 76 causes rotation of member 58 and 70 about their respective axis.

The latching mechanism 48 further comprises a release mechanism 86 having a lever 88 pivotally mounted to the second portion 34 for rotation about an axis 90. Lever 88 may be operably coupled to a release handle 92 via a linkage or cable 94 such that actuation of the handle 92 causes rotational movement of the lever 88. In one embodiment release handle 92 may be located on a surface of the tailgate 14.

Figure 4:
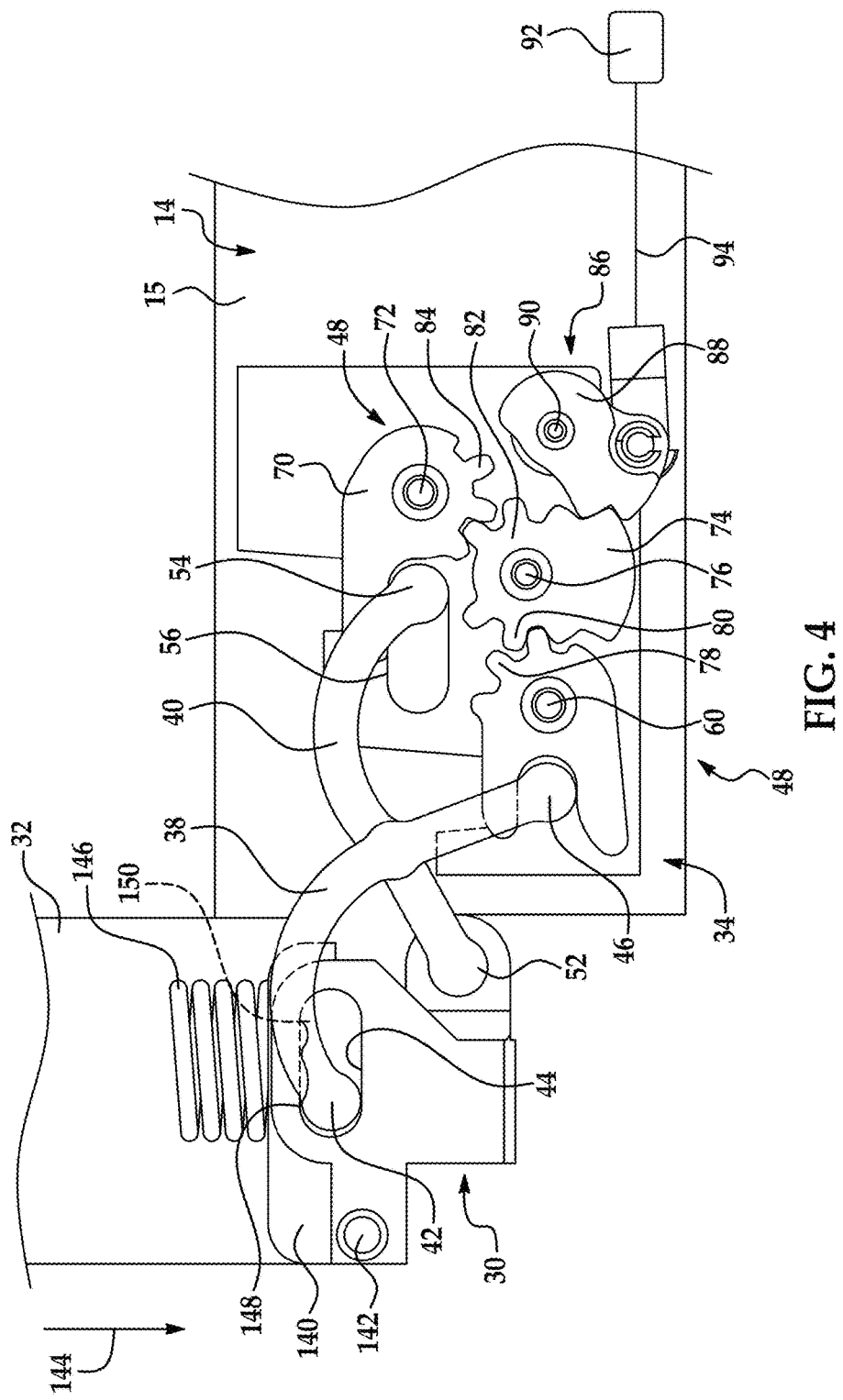
FIG. 4 is a view of an upper latch of the tailgate latch system in a closed position in accordance with an embodiment of the present disclosure.
Figure 5:
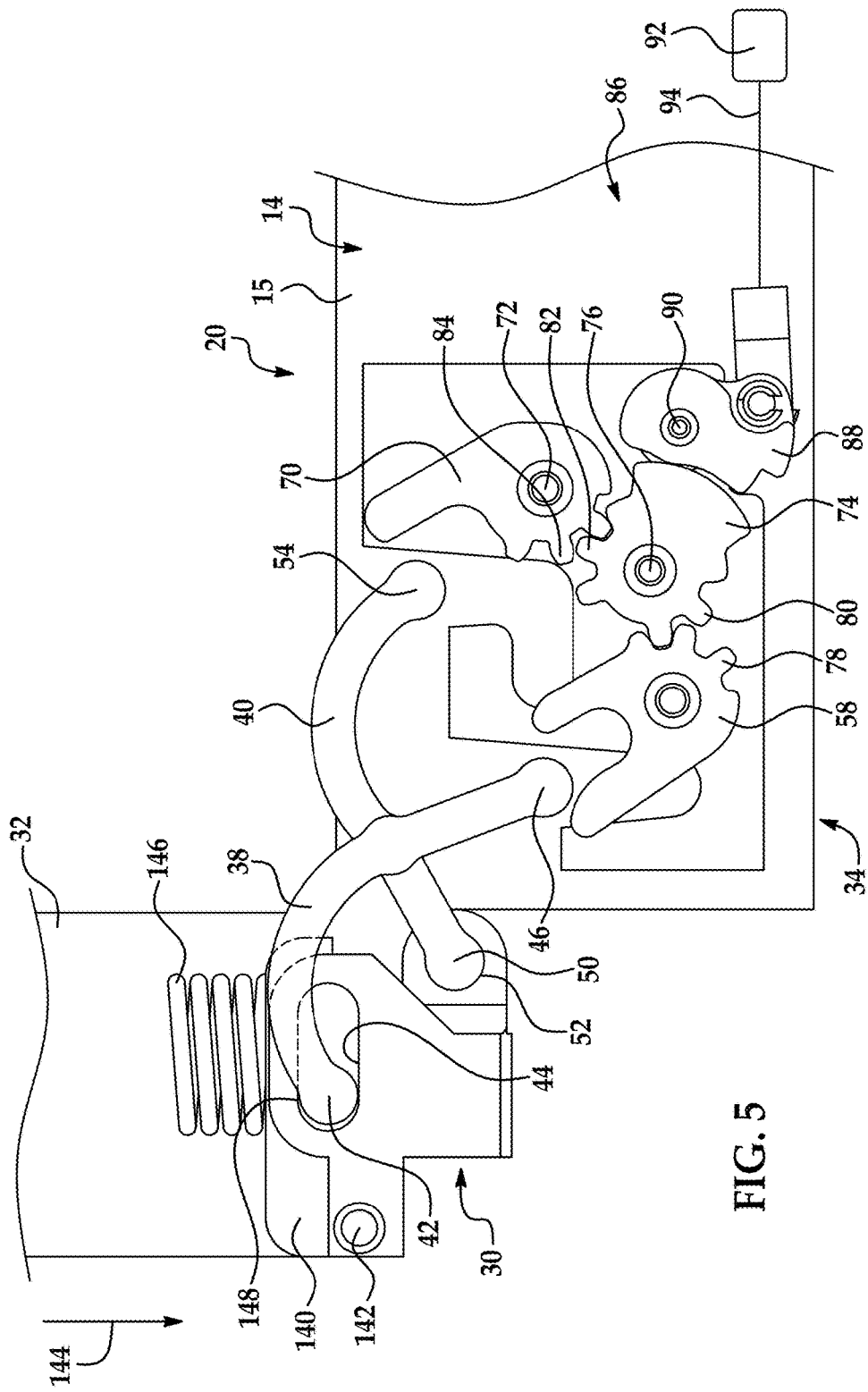
FIG. 5 is a view of an upper latch of the tailgate latch system in an open position in accordance with an embodiment of the present disclosure.

In FIG. 4, the upper latch 20 of the tailgate latch system 28 is in a closed position wherein ends 46 and 54 are retained by members 58 and 70 of the latch mechanism 48. In FIG. 4, members 58, 70, 74 and 88 are in a first position corresponding to the latch 20 being in a latched state (e.g., tailgate 14 closed). Upon actuation of handle 92, the members 58, 70, 74 and 88 rotate about their respective axis to a second position wherein the ends 46 and 54 of the arms 38 and 40 are released from the latch 20 and the tailgate 14 can now pivot about axis 18. This is illustrated in FIG. 5. Once the members 58, 70, 74 and 88 are located in their respective second positions the ends 46 and 54 are released from the openings of the latch 20. At this point, the tailgate 14, 15 or 17 is now free to pivot about axis 18.

Figure 6:
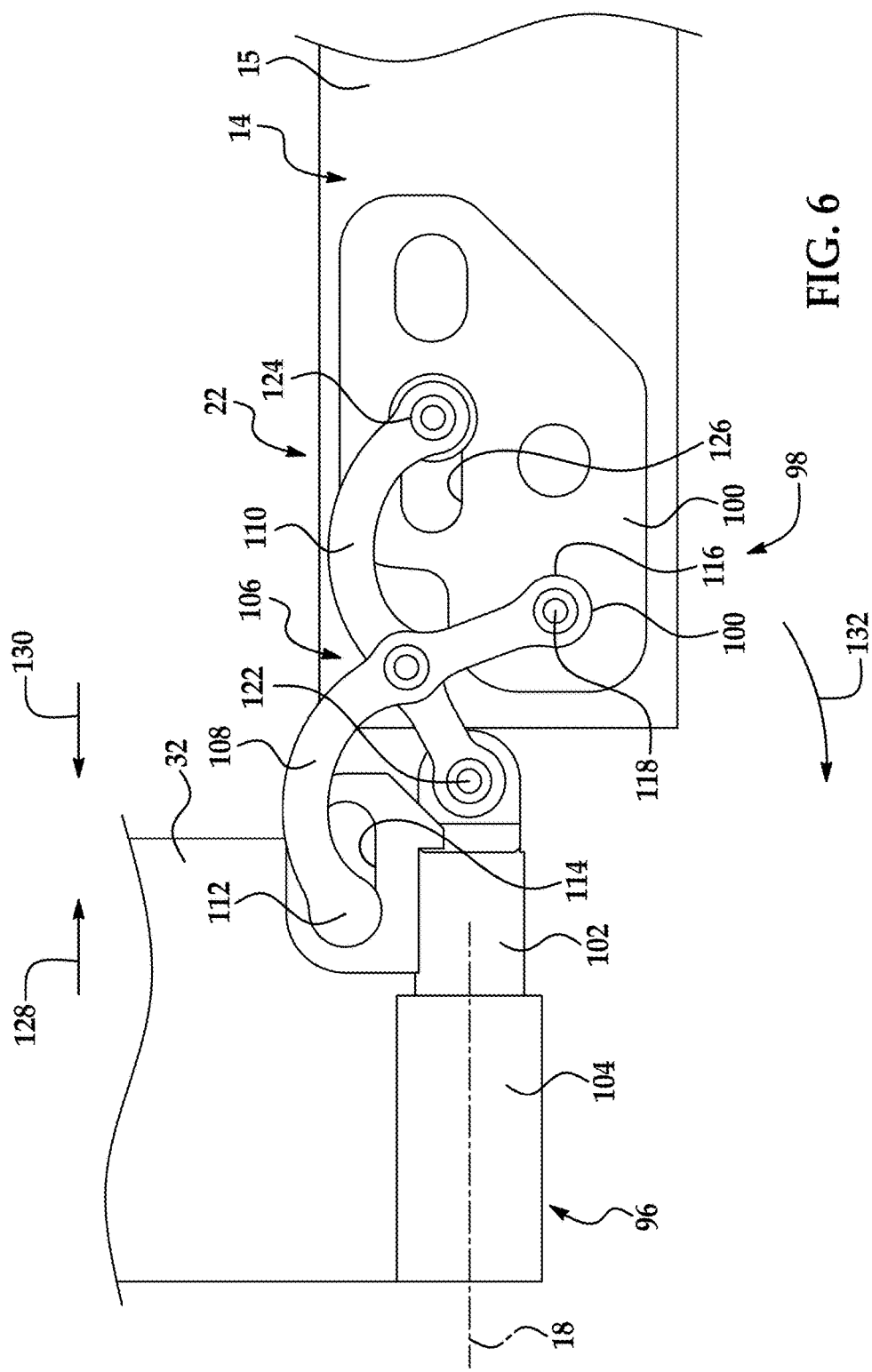
FIG. 6 is a view of the lower hinge of the tailgate latch system in a closed position in accordance with an embodiment of the disclosure.
Figure 7:
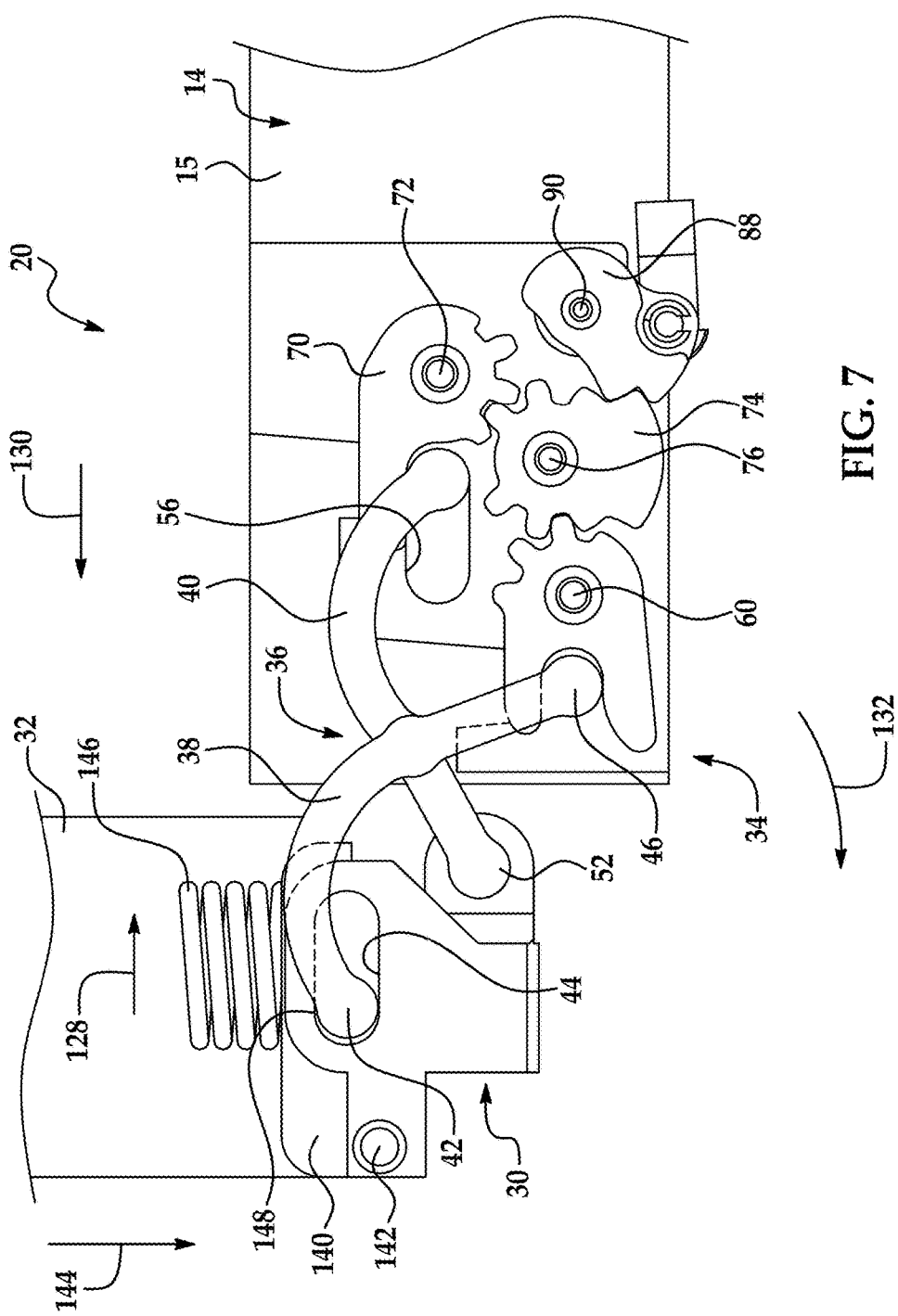
FIG. 7 is a view of an upper latch of the tailgate latch system in a closed position in accordance with an embodiment of the disclosure.

FIG. 6 is a view of the lower hinge 22 of the tailgate latch system 28. Hinge 22 has a first portion 96 operatively coupled to a second portion 98. Second portion 98 has a frame member or plate 100 secured to a portion of the tailgate 14 while first portion 96 is secured to the frame member 32 of the vehicle 10. In order to allow the tailgate 14 or rotate about axis 18, the first portion 96 has a shaft member 102 rotatably received within a housing 104 of the first portion 96. Shaft member 102 is configured to rotate about axis 18 such that when latch 20 is released tailgate 14 can rotate about axis 18. The frame member or plate 100 of the second portion 98 is secured movably secured to the first portion 96 via a linkage 106. Linkage 106 has a first arm member 108 and a second arm member 110. As illustrated in FIG. 3 and in accordance with one non-limiting embodiment of the present invention, the linkage 106 may comprise a plurality of first arm members 108 and a plurality of second arm members 110. The first arm member 108 has a first end 112 rotatably and slidably received within an opening 114 of the first portion 96. A second end 116 of first arm member 108 is also rotatably secured to the frame member 100 for rotation about axis 118. The second arm member 110 is rotatably secured to the first portion 96 at a first end 120 for rotation about axis 122. A second end 124 of the second arm member 110 is rotatably and slidably received within an elongated opening 126.

As mentioned above, shaft member 102 allows the tailgate to rotate about axis 18 when the upper latch 20 is released.

Referring now to at least FIGS. 6-9 and in order to allow the tailgate 14 to rotate about axis 16, both upper latch 20 and lower hinge 22 operate as hinges to allow for rotational movement of the tailgate 14 about axis 16 when the opposite side of the tailgate 14 is released from its corresponding body portion of the vehicle 10. In order to facilitate this rotational movement of the tailgate about a vertical axis 16, the elongated openings 114 and 126 of the lower hinge 22 and the elongated openings 44 and 56 of the upper latch 20 allow for slidable movement of the ends of the arm members received therein to move in the directions of arrows 128 and 130 such that the tailgate 14 can pivot or rotate in the direction of arrow 132 with respect to the body portion of the vehicle 10 (e.g., rotate about axis 16).

Figure 8:
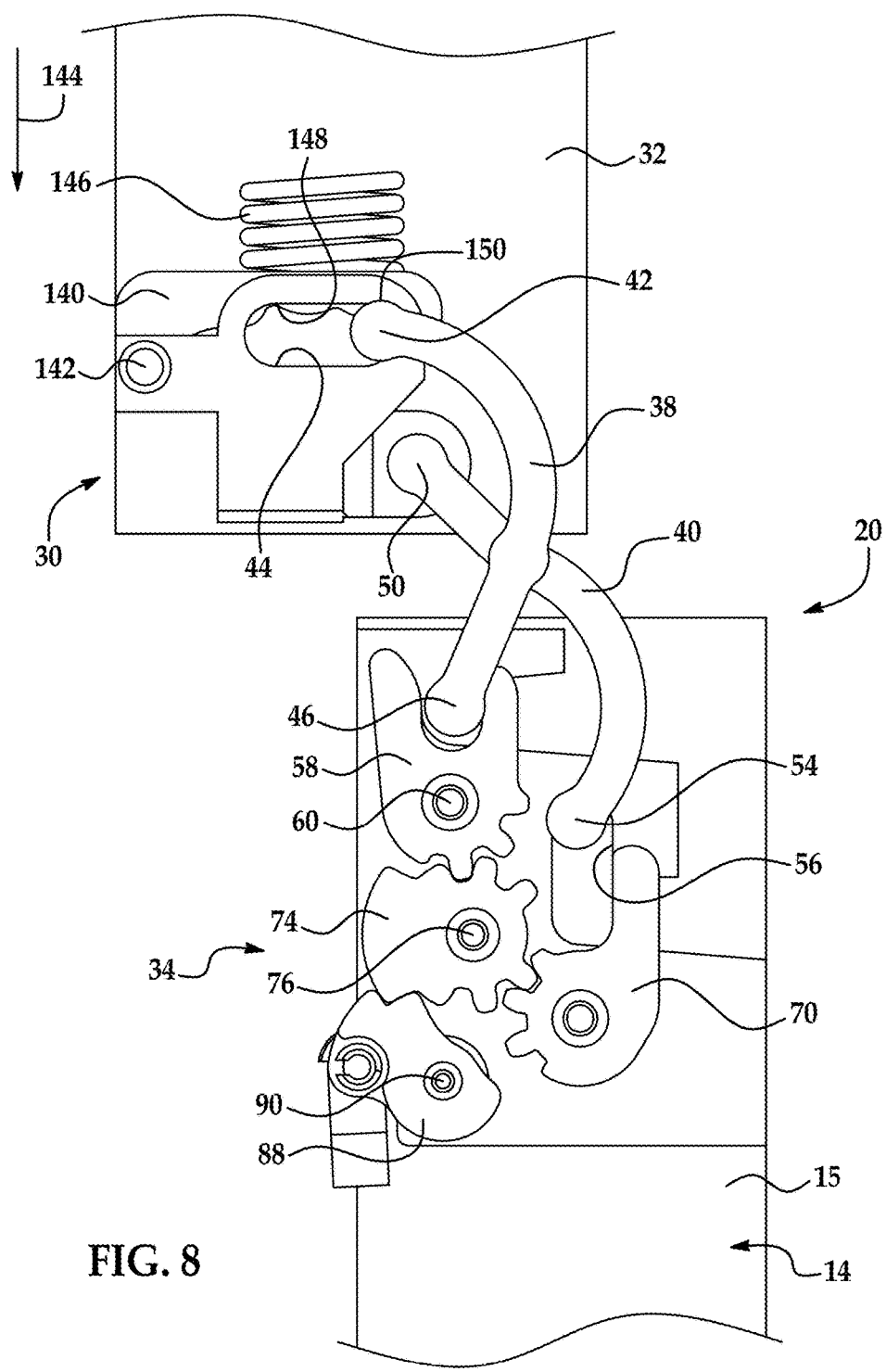
FIG. 8 is a view illustrating the upper latch of the tailgate latch system operating as a hinge.
Figure 9:
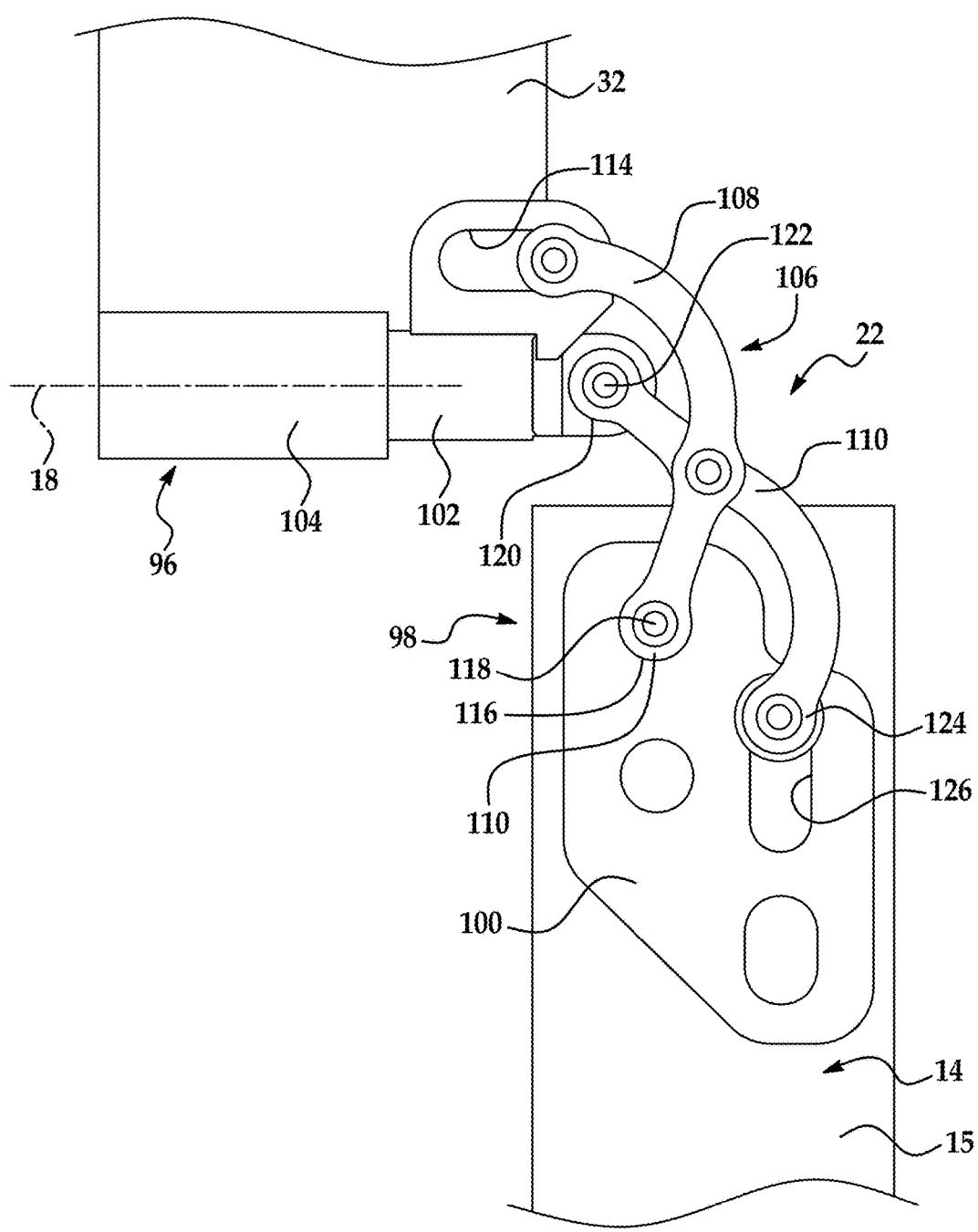
FIG. 9 is a view of the lower hinge of the tailgate latch system in an open position in accordance with an embodiment of the disclosure.

For example, FIG. 8 illustrates the upper latch 20 and tailgate 15 being rotated approximately 90 degrees about axis 16. In addition and due to the configurations of the linkages 36 and 106, the tailgate 15 can rotate approximately 180 degrees in the direction of arrow 132 from the closed position to an open position by further rotating about axis 16. FIG. 9 illustrates the lower hinge 22 and tailgate 15 being rotated approximately 90 degrees about axis 16. In order to retain the tailgate 15 in this position, a retention member 140 is pivotally mounted to the latch 20 for rotation about an axis 142. The retention member is spring biased downwardly in the direction of arrow 144 by a spring 146. The retention member has a plurality of cam surfaces or valleys 148 and 150 configured to receive and retain end 42 of arm 40 as it slides within opening 44.

For example and as illustrated in FIGS. 2, 4, 5 and 7, valley or cam surface 148 through spring 146 provides a force in the direction of arrow 144 to retain portion 42 in the illustrated position until a rotational force in the direction of arrow 132 is applied to the tailgate 15 in order to overcome the biasing force of spring 146 in the direction of arrow 144. In other words, spring 146 contacts member 140 at one end and a portion of the vehicle 10 at another end so a biasing force in the direction of arrow 144 is applied to end 42. As end 42 slides within opening 44 it will move in the direction of arrow 128 and then be retained in the position illustrated in FIG. 8 when valley or cam surface 150 of member 140 contact end 42. In this position, the tailgate 15 is retained in the 90 degree open position. It is, of course, understood that cam surfaces or valleys 148 and 150 may be in other locations to provide varying degrees of stops for tailgates 15, 17 as they rotate about axes 16. For example, additional non-limiting locations may be 30, 45, 60, 120, 150, etc. degrees.

In addition and in an alternative embodiment and due to the configurations of the linkages 36 and 106, the tailgate 15 may be able to rotate approximately 180 degrees in the direction of arrow 132 from the closed position to an open position by further rotating about axis 16. This may be achieved by allowing ends 42, 46, 50 and 54 to rotate about a vertical axis. Similarly, the ends 112, 116, 120, 124 of lower hinge 22 may also rotate about a vertical axis so that the tailgate 15 can rotate further in the direction of arrow 132 from the position illustrated in FIGS. 8 and 9.

Accordingly and through the use of an upper latch 20 that is configured to operate as both a latch and a hinge, the tailgate 14 or tailgate 15 can be opened and closed with respect to the vehicle 10 by rotating about either one of a vertical axis 16 or a horizontal axis 18.

Although the upper latch 20 and lower hinge 22 of FIGS. 2-9 are described with regard to the left tailgate 15 it is, of course, understood that the operation of the upper latch 20 and the lower hinge 22 for the right tailgate 17 is similar but from a reverse perspective with regard to FIGS. 2-9.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle tailgate latch, comprising:
   a first portion;
   a second portion;
   a linkage comprising a pair of arms releasably securing the first portion to the second portion, wherein the second portion when secured to the first portion is rotatably secured to the first portion for movement about a vertical axis with respect to the first portion; and
   a latching mechanism for releasing the second portion from the first portion, wherein one end of one of the pair of arms is slidably and rotatably received in an elongated opening of the first portion and an opposite end of the one of the pair of arms is rotatably received in the second portion and wherein one end of the other one of the pair of arms is slidably and rotatably received in an elongated opening of the second portion and an opposite end of the other one of the pair of arms is rotatably received in the first portion.

2. A vehicle tailgate latch, comprising:
   a first portion;
   a second portion;
   a linkage releasably securing the first portion to the second portion, wherein the second portion when secured to the first portion is rotatably secured to the first portion for movement about a vertical axis with respect to the first portion; and
   a latching mechanism for releasing the second portion from the first portion, wherein the latching mechanism has a first claw pivotally mounted to the second portion for rotation about an axis and a second claw pivotally mounted to the second portion for rotation about an axis, wherein the first claw is operatively linked to the second claw via an intermediary member rotatably mounted to the second portion for rotation about an axis and wherein the first claw and the intermediary member each have gear teeth for meshingly engaging each other such that rotation of member about axis causes rotation of first claw and second claim.

3. The vehicle tailgate latch as in claim 1, wherein the latching mechanism further comprises a release mechanism having a lever pivotally mounted to the second portion for rotation about an axis, wherein the lever is operably coupled to a release handle via a linkage such that actuation of the handle causes rotational movement of the lever.

4. The vehicle tailgate latch as in claim 3, wherein the release handle is located on a surface of the tailgate.

5. The vehicle tailgate latch as in claim 1, wherein the latching mechanism has a first claw pivotally mounted to the second portion for rotation about an axis and a second claw pivotally mounted to the second portion for rotation about an axis, wherein the first claw is operatively linked to the second claw via an intermediary member rotatably mounted to the second portion for rotation about an axis.

6. The vehicle tailgate latch as in claim 5, wherein the first claw and the intermediary member each have gear teeth for meshingly engaging each other such that rotation of member about axis causes rotation of first claw and second claim.

7. The vehicle tailgate latch as in claim 6, wherein the latching mechanism further comprises a release mechanism having a lever pivotally mounted to the second portion for rotation about an axis, wherein the lever is operably coupled to a release handle via a linkage such that actuation of the handle causes rotational movement of the lever.

8. The vehicle tailgate latch as in claim 7, wherein the release handle is located on a surface of the tailgate.

9. A tailgate latch system, comprising:
an upper latch, comprising: a first portion; a second portion; a linkage for releasably securing the first portion to the second portion, wherein the second portion when secured to the first portion is rotatably secured to the first portion for movement about a vertical axis with respect to the first portion; and a latching mechanism for releasing the second portion from the first portion, wherein the first portion is secured to a vehicle frame and wherein the second portion is secured to a tailgate; and
a lower hinge comprising: a first portion operatively coupled to a second portion, wherein the second portion has a frame member secured to the tailgate while the first portion is secured to the frame member and wherein the lower hinge is configured to allow the tailgate to rotate about a horizontal axis when the second portion is released from the first portion, wherein the first portion of the lower hinge has a shaft member rotatably received within a housing of the first portion, and wherein shaft member is configured to rotate about horizontal axis.

10. A tailgate latch system, comprising:
an upper latch, comprising: a first portion; a second portion; a linkage for releasably securing the first portion to the second portion, wherein the second portion when secured to the first portion is rotatably secured to the first portion for movement about a vertical axis with respect to the first portion; and a latching mechanism for releasing the second portion from the first portion, wherein the first portion is secured to a vehicle frame and wherein the second portion is secured to a tailgate; and
a lower hinge comprising: a first portion operatively coupled to a second portion, wherein the second portion has a frame member secured to the tailgate while the first portion is secured to the frame member and wherein the lower hinge is configured to allow the tailgate to rotate about a horizontal axis when the second portion is released from the first portion, wherein the frame member is movably secured to the first portion of the lower hinge via a linkage, wherein the linkage has a first arm member and a second arm member and wherein the first arm member has a first end rotatably and slidably received within an opening of the first portion and a second end of first arm member is also rotatably secured to the frame member for rotation about an axis and wherein the second arm member is rotatably secured to the first portion at a first end for rotation about axis and a second end of the second arm member is rotatably and slidably received within an elongated opening.

11. The tailgate latch system as in claim 10, wherein the latching mechanism has a first claw pivotally mounted to the second portion for rotation about an axis and a second claw pivotally mounted to the second portion for rotation about an axis, wherein the first claw is operatively linked to the second claw via an intermediary member rotatably mounted to the second portion for rotation about an axis 76.

12. The tailgate latch system as in claim 11, wherein the first claw and the intermediary member each have gear teeth for meshingly engaging each other such that rotation of member about axis causes rotation of first claw and second claim and wherein the latching mechanism further comprises a release mechanism having a lever pivotally mounted to the second portion for rotation about an axis, wherein the lever is operably coupled to a release handle via a linkage such that actuation of the handle causes rotational movement of the lever.

13. The tailgate latch system as in claim 12, wherein the system comprises a pair of upper latches and a pair of lower hinges and wherein the tailgate further comprises a left tailgate and a right tailgate each being secured to the vehicle frame by one of the pair of upper latches and one of the pair of lower hinges.

14. The tailgate latch system as in claim 9, wherein the system comprises a pair of upper latches and a pair of lower hinges and wherein the tailgate further comprises a left tailgate and a right tailgate each being secured to the vehicle frame by one of the pair of upper latches and one of the pair of lower hinges.

15. A tailgate latch system, comprising:
an upper latch, comprising: a first portion; a second portion; a linkage for releasably securing the first portion to the second portion, wherein the second portion when secured to the first portion is rotatably secured to the first portion for movement about a vertical axis with respect to the first portion; and a latching mechanism for releasing the second portion from the first portion, wherein the first portion is secured to a vehicle frame and wherein the second portion is secured to a tailgate; and
a lower hinge comprising: a first portion operatively coupled to a second portion, wherein the second portion has a frame member secured to the tailgate while the first portion is secured to the frame member and wherein the lower hinge is configured to allow the tailgate to rotate about a horizontal axis when the second portion is released from the first portion, wherein the linkage further comprises a pair of arms and wherein one end of one of the pair of arms is slidably and rotatably received in an elongated opening of the first portion and an opposite end of the one of the pair of arms is rotatably received in the second portion and wherein one end of the other one of the pair of arms is slidably and rotatably received in an elongated opening of the second portion and an opposite end of the other one of the pair of arms is rotatably received in the first portion; and wherein the latch system further comprises a retention member pivotally mounted to the latch for rotation about an axis, wherein the retention member is spring biased towards end via a spring such that a cam surface retains end in one of two positions within opening.

* * * * *